US009363258B2

(12) United States Patent
Boyer et al.

(10) Patent No.: US 9,363,258 B2
(45) Date of Patent: Jun. 7, 2016

(54) SECURE DIGITAL SIGNATURE SYSTEM

(75) Inventors: John Michael Boyer, Victoria (CA); David Franklin Manning, Victoria (CA); Michael Cain Mansell, Victoria (CA); Sonja Christine McLellan, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 11/957,882

(22) Filed: Dec. 17, 2007

(65) Prior Publication Data

US 2009/0158043 A1    Jun. 18, 2009

(51) Int. Cl.
*H04L 9/00* (2006.01)
*H04L 29/06* (2006.01)
*H04L 9/32* (2006.01)

(52) U.S. Cl.
CPC .......... *H04L 63/0823* (2013.01); *H04L 9/3281* (2013.01)

(58) Field of Classification Search
CPC .......................... H04L 9/3281; H04L 63/0823
USPC ................... 713/156, 169, 175, 176; 726/2, 5
See application file for complete search history.

(56) References Cited

U.S. PATENT DOCUMENTS

| 6,959,382 | B1 * | 10/2005 | Kinnis et al. ................. 713/170 |
| 7,904,725 | B2 * | 3/2011 | Pavlicic ........................ 713/176 |
| 7,966,491 | B2 * | 6/2011 | Nassor et al. ................ 713/168 |
| 8,112,444 | B2 * | 2/2012 | Schwartz et al. ............. 707/783 |
| 8,184,811 | B1 * | 5/2012 | Patten et al. .................. 380/247 |
| 8,627,403 | B1 * | 1/2014 | Kirshenbaum et al. .......... 726/1 |
| 2002/0083124 | A1 * | 6/2002 | Knox et al. .................... 709/203 |
| 2002/0184507 | A1 | 12/2002 | Makower et al. |
| 2003/0105876 | A1 * | 6/2003 | Angelo et al. ................ 709/237 |
| 2003/0217264 | A1 * | 11/2003 | Martin et al. ................. 713/156 |

(Continued)

FOREIGN PATENT DOCUMENTS

| CN | 101465848 A | 6/2009 |
| JP | 2006224896 A | 8/1994 |

(Continued)

OTHER PUBLICATIONS

Chinese Office Action dated Jul. 26, 2011, regarding Chinese Publication No. CN/200810166377.9, Application No. CN101465848A.

(Continued)

*Primary Examiner* — Aravind Moorthy
*Assistant Examiner* — Peiliang Pan
(74) *Attorney, Agent, or Firm* — Yee & Associates, P.C.; William J. Stock

(57) ABSTRACT

The illustrative embodiments provide a computer implemented method, apparatus, and computer program product for receiving a request from a client to instantiate an electronic document. After successful completion of mutual authentication between a web application server and the client, the web application server provides the electronic document to the client. The web application server may then receive a set of changes associated with the electronic document to form a modified document. After receiving a request from the client for a digital signature to be generated for the modified document, the web application server generates a digital signature using a private key of the web application server and an identity of an end-user associated with the client. The web application server then signs the modified document with the digital signature.

20 Claims, 5 Drawing Sheets

(56) References Cited

U.S. PATENT DOCUMENTS

| | | | |
|---|---|---|---|
| 2003/0221104 A1* | 11/2003 | Baessler | 713/175 |
| 2003/0221109 A1 | 11/2003 | Boyer et al. | |
| 2003/0237004 A1 | 12/2003 | Okamura | |
| 2005/0182684 A1 | 8/2005 | Dawson et al. | |
| 2006/0224895 A1* | 10/2006 | Mayer | 713/176 |
| 2007/0061567 A1 | 3/2007 | Day et al. | |

FOREIGN PATENT DOCUMENTS

| | | |
|---|---|---|
| JP | 2011025048 A | 1/1999 |
| JP | 2001515612 A | 9/2001 |
| JP | 2002123492 | 4/2002 |
| JP | 2003099214 A | 4/2003 |
| JP | 2004023406 A | 1/2004 |
| JP | 2004336315 A | 11/2004 |
| JP | 2006511104 A | 3/2006 |
| JP | 2006526180 A | 11/2006 |

OTHER PUBLICATIONS

Une et al., "The Current State of Digital Timestamp Technology and Issues Thereof," IMES Discussion Paper Series, Institute for Monetary and Economic Studies, Bank of Japan, vol. 99-J-36, Jun. 2009, 17 pages. (Translation 9 pages, original Japanese 8 pages).

* cited by examiner

SECURE DIGITAL SIGNATURE SYSTEM

BACKGROUND OF THE INVENTION

1. Field of the Invention

The present invention relates generally to a data processing system and in particular to digital signatures. More particularly, the present invention is directed to a computer implemented method, apparatus, and computer usable program code for generating secure digital signatures over rich web application content.

2. Description of the Related Art

Public key cryptography is a form of cryptography that used a public key and private key pair. The private key is kept a secret and known only to the holder of the private key. The public key paired with the private key is related mathematically to the private key and may be distributed publicly. A digital signature is a type of cryptography that uses a private key to create a signature. Any user with the public key may then verify the signature.

Thus, a digital signature is a cryptographically secure means of both protecting a message from tampering and associating an individual's identity with the message content. A message is any type of information or communication, such as, for example and without limitation, an email message, an extensible markup language (XML) of an electronic form representing a business transaction, a contract, or any other finite length byte sequence. A form is a general purpose application with special enablement for data collection and transport. A signer of a digital signature is a user that effects the transaction or contract, such as a transaction or contract represented by a form.

A digital signature typically includes a message authentication token and a signer authentication token. The authentication token for the message should be cryptographically secure. Similarly, the authentication token for the signer should be bound to the message in a cryptographically secure manner. These measures are necessary to ensure that it is computationally infeasible to tamper with the message without invalidating the digital signature, or associate the signer's authentication token with an altered message without invalidating the signature. Furthermore, it should be feasible to invalidate the signature by expiry or revocation of the signer's credentials.

The signing identity is composed of a private key and a public key certificate. The signer's private key material must be used to help generate a digital signature to associate the identity of the signer with the signed message content. Access to the operations involving the signer's private key is only granted to trusted applications on the end-user's computer. This is a problematic requirement for web applications that restrict deployment of client-side executable code other than the client-side web browser. Additionally, it is difficult to digitally sign content that fully represents the rich web application experience of the user because the bulk of the content comprising the full web application is maintained by the server.

In one current practice, digital signing of rich content documents is provided via client-side software. However, this solution requires the user to install or upgrade client-side software to enable the digital signing of rich content documents provided by the rich content document server.

In another current practice, rich content documents are provided by zero footprint web application server products that are incapable of digital signature security. A zero footprint web application server is a server that provides access to web applications without downloading or installing software associated with the application on the client. However, this solution compromises the security and authenticity of the documents because digital signature security is unavailable to the users.

SUMMARY OF THE INVENTION

The illustrative embodiments provide a computer implemented method, apparatus, and computer program product for receiving a request from a client to instantiate an electronic document. After successful completion of mutual authentication between a web application server and the client, the web application server provides the electronic document to the client. The web application server may then receive a set of changes associated with the electronic document to form a modified document. After receiving a request from the client for a digital signature to be generated for the modified document, the web application server generates a digital signature using a private key of the web application server and an identity of an end-user associated with the client. The web application server then signs the modified document with the digital signature.

In yet another embodiment, after a document has been digitally signed at least once, the process for responding to further requests from the client to instantiate the electronic document is augmented. Any digital signatures associated with the document are validated based on the public key certificate of the web application server as well as the public key certificate or public identity of the signer and any other metadata.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
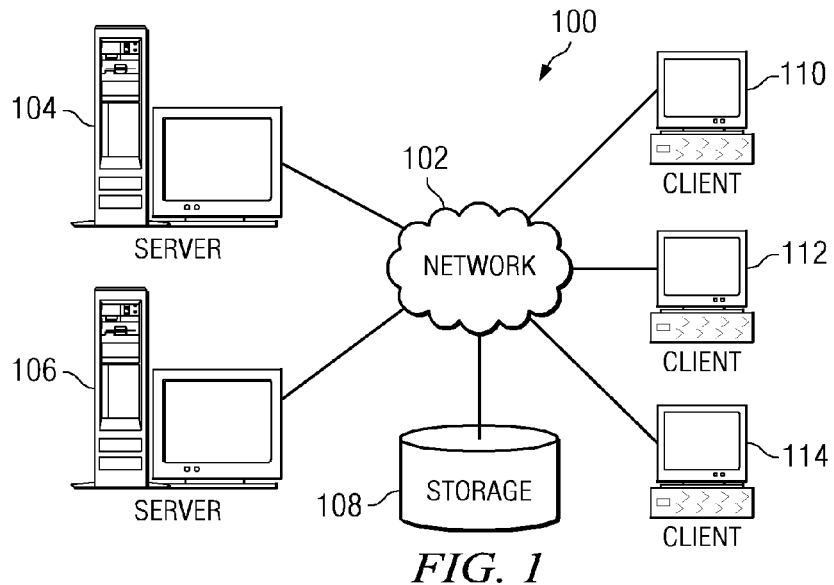
FIG. 1 is a pictorial representation of a network of data processing systems in which illustrative embodiments may be implemented.
Figure 2:
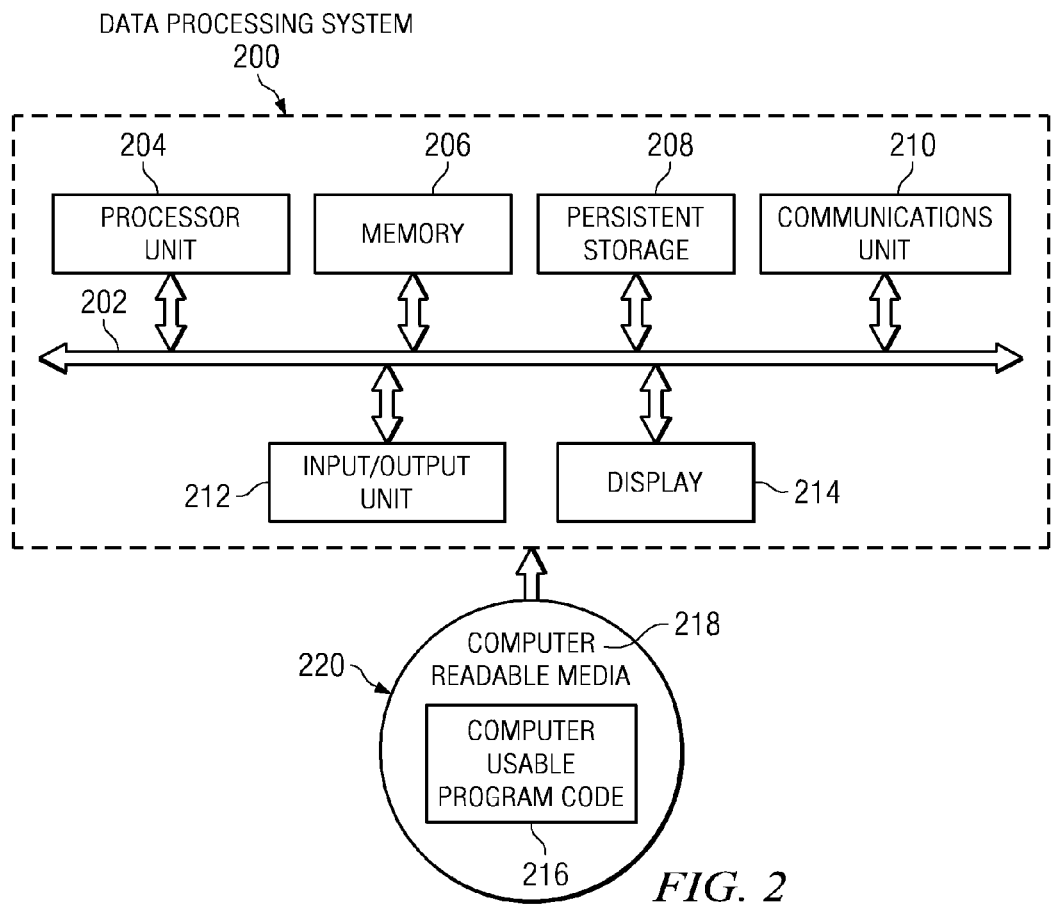
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this example, server 104 is zero footprint web application server and server 106 is a standard web application server. A zero footprint web application server is a software engine that delivers software applications to clients 110, 112, and 114 over network 102 without installing rich content web applications software on clients 110, 112, and 114. Server 104 includes a signature validator and a signature generator. Server 104 is one example of a server in which the illustrative embodiments may be implemented. In another example, server 106 may also include a signature validator and a signature generator.

In addition, clients 110, 112, and 114 connect to network 102. Clients 110, 112, and 114 may be, for example, personal computers or network computers. In the depicted example, server 106 provides data, such as boot files, operating system images, and applications to clients 110, 112, and 114. Clients 110, 112, and 114 are clients to server 104 or 106 in this example. In FIG. 1, client 110 includes a user private key for completing mutual authentication processes with server 104 or 106. Mutual authentication refers to a client or user authenticating themselves to a server and that server authenticating themselves to the user in such a way that both parties are assured of the others' identity. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Computer usable program code 216 is located in a functional form on computer readable media 218 that is selectively removable and may be loaded onto or transferred to data processing system 200 for execution by processor unit 204. Computer usable program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media x18 is also referred to as computer recordable storage media. In some instances, computer recordable media 218 may not be removable.

Alternatively, computer usable program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments recognize a need for a system that is capable of creating cryptographically secure digital signatures over rich web application content that satisfies the requirements of infeasibility of tampering with a message without invalidating the digital signature, infeasibility of associating the signer's authentication token with an altered message without invalidating the digital signature, and still ensuring the feasibility of invalidating the signature due to expiry or revocation of the signer's credentials.

Therefore, the illustrative embodiments provide a computer implemented method, apparatus, and computer program product for receiving a request from an application server to instantiate an electronic document. After successful completion of mutual authentication between the application server and a client, the application server provides the electronic document to the client. The web application server then receives a set of changes to the electronic document to form a modified document. After receiving a request from the client for a digital signature to be generated for the modified document, the web application server generates a digital signature using a private key of the web application server and an identity of an end-user associated with the client. The web application server then signs the modified document with the digital signature.

Figure 3:
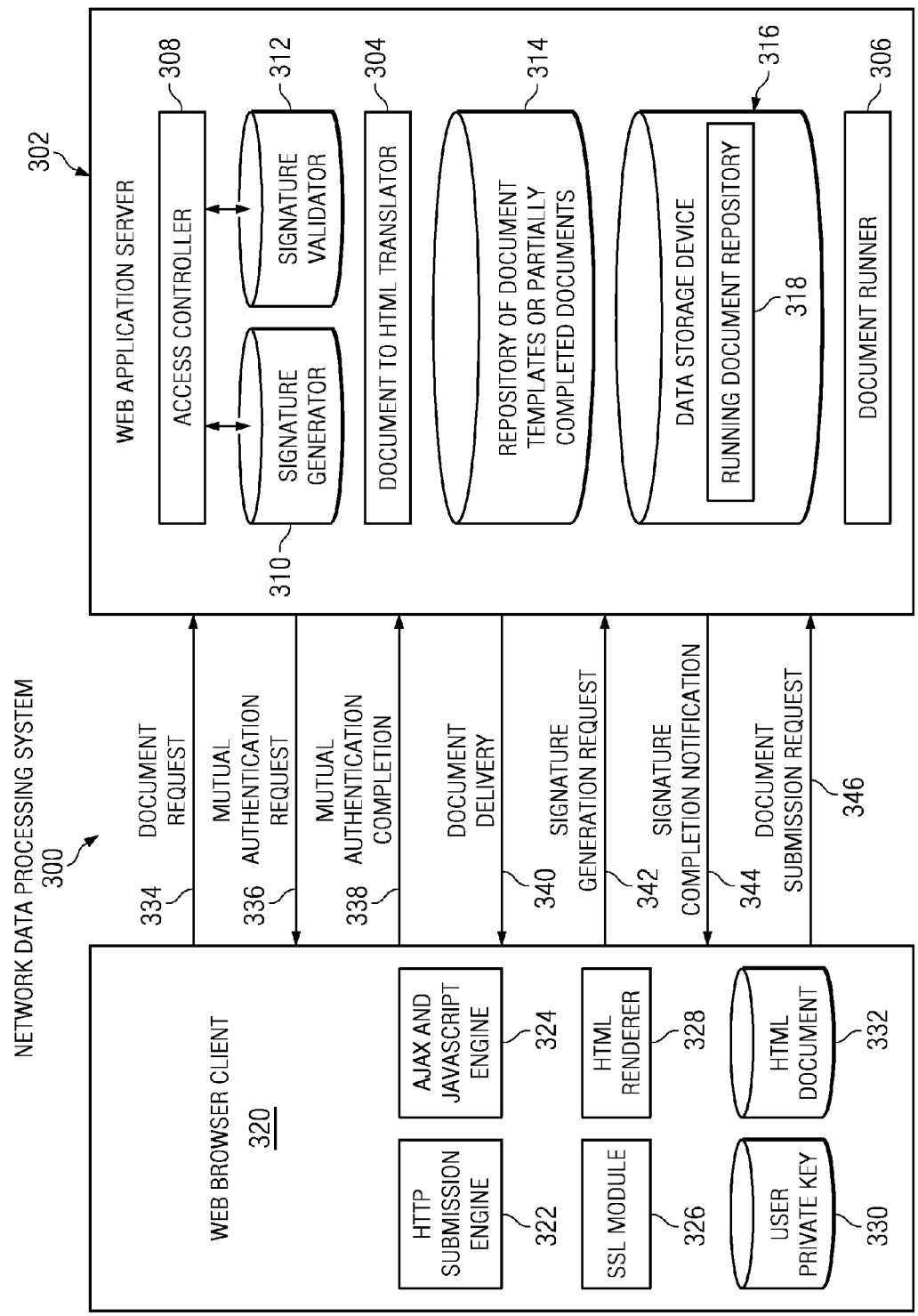
FIG. 3 is a block diagram illustrating a data flow when a digital signature is generated in accordance with an illustrative embodiment.

FIG. 3 is a block diagram illustrating a data flow when a digital signature is generated in accordance with an illustrative embodiment. Network data processing system 300 may be implemented using any type of computing device, including, without limitation, a personal computer, laptop, personal digital assistant, a server, or any other computing device depicted in FIGS. 1 and 2.

Web application server 302 may be any type of server known in the art for providing applications to clients over a network. For example, web application server 302 can be a standard web application server or a zero footprint web application server. A zero footprint application server deploys only a web browser and no other type of client-side executable code.

In this example, web application server 302 includes document to HTML translator 304, document runner 306, access controller 308, signature generator 310, signature validator 312, repository of document templates or partially completed documents 314, data storage device 316, and running document repository 318. However, web application server 302 may also include additional features and components not shown in FIG. 3 without departing from the scope of the illustrative embodiments.

Document to HTML translator 304 is a software component that creates the hypertext markup language (HTML) and Javascript/AJAX content for the portion of the rich web application document that an end-user must interact with at a particular time. Document runner 306 generates and monitors state transitions and subtasks completed within web application server 302. In one example, document runner 306 executes a document on behalf of an end-user, or at the request of custom servlets and portlets designed to extract information from the document and act upon that information to drive back end business processes. In another example, document runner 306 validates existing signatures in a document when it is first loaded, and revalidates particular signatures upon request.

Access controller 308 contains all information related to mutual authentication between the server and end-users, including the server private key. Signature generator 310 and signature validator 312 uses information stored in access controller 308 to generate and validate signatures in response to a request from end-users. Repository of document templates or partially completed documents 314 contains both empty rich web application documents and partially completed documents that can be instantiated by the system. For example, repository of document templates or partially completed documents 314 might contain a rich web application document, a stage of a guided interview, or a wizard process. As used herein, a document template includes, without limitation, a form, a partially completed document, or a partially completed document signed by one or more users but requiring one or more additional signatures to complete. A document template could be, for example, a business transaction or a contract. Data storage device 316 contains running document repository 318. In this example, running document repository 318 contains instances of document templates and partially completed documents that have been created for end-users and are currently in the process of becoming completed transaction records.

Web browser client 320 includes hypertext transfer protocol (HTTP) submission engine 322, asynchronous JavaScript and XML (AJAX) and JavaScript engine 324, secure sockets layer (SSL) module 326, hypertext markup language (HTML) renderer 328, user private key 330, and hypertext markup language (HTML) document 332. The components of web browser client 320, in this embodiment, are examples of typical components needed for a fully operational hypertext markup language (HTML) document. Web browser client 320 is a trusted application that has access to the user's private key material for secure sockets layer (SSL) authentications. In this embodiment, the user experience is governed only by these pre-existing trusted components combined with the hypertext markup language (HTML) document delivered to the client side dynamically by web application server 302. Because no other client-side software is required for this system, one example of the application behavior attainable from this system is that of a zero footprint application. A zero footprint application is an end-user application that is stored entirely on a server and does not deploy client-side executable code.

Thus, in this embodiment, web browser client 320 sends document request 334 to web application server 302. Request 334 is a request for instantiation of a document template or partially completed document from repository of document templates or partially completed documents 314. HTTP submission engine 322 is a request/response protocol used to transfer or convey request 334 to web application server 302.

In response to receiving request 334 from web browser client 320 for instantiation of a document, web application server 302 sends mutual authentication request 336 to web browser client 320 and initiates mutual authentication. In order to successfully complete mutual authentication, the correct user private key material must be used. Mutual authentication may be implemented using any of the methods known in the art, including, without limitation, single sign-on via SSL mutual authentication, HTTP basic authentication, or other non-public key infrastructure (non-PKI) authentication methods. The correct private key is used to successfully complete the authentication. Web browser client 320 sends mutual authentication completion 338 to web application server 302. If the authentication is successful, web application server 302 makes the public key or other public identity associated with web browser client 320 available to the application context, including document runner 306.

Web application server 302 then instantiates the requested document template or partially completed document and converts the document to a run-time format available on web browser client 320. Document to HTML translator 304 converts the document to the appropriate run-time format. For example, in this embodiment the server uses document to HTML translator 304 to convert the document to HTML and Javascript/AJAX and deliver the document to web browser client 320 in FIG. 3 via document delivery 340.

HTML renderer 328 renders the document for display to a user at web browser client 320. AJAX and JavaScript engine 324 exchanges data with web application server 302 to reflect changes to the document made by the user at web browser client 320. The data transfers can be made secure by SSL module 326 which uses secure sockets layer protocols to secure messages transmitted over a network to web application server 302. Web browser client 320 then transmits signature generation request 342 for a digital signature to be generated for the document.

After web application server 302 receives any end-user input to fill out or change the document and change pages if the document is a multi-page document, and signature generation request 342 for a digital signature to be generated for the document, web application server 302 signs the document based on the end-user identity. Web application server 302 obtains the end-user identity during the mutual authentication process. Next, web application server 302 sends signature completion notification 344 to web browser client 320, communicating to the end-user that the document has been signed with a digital signature. Web application server 302 then receives document submission request 346 to submit the signed document for processing. Such processing may involve being stored in repository of document templates or partially completed documents 314 to allow further interaction, sets of changes and signatures on the document by other clients.

Figure 4:
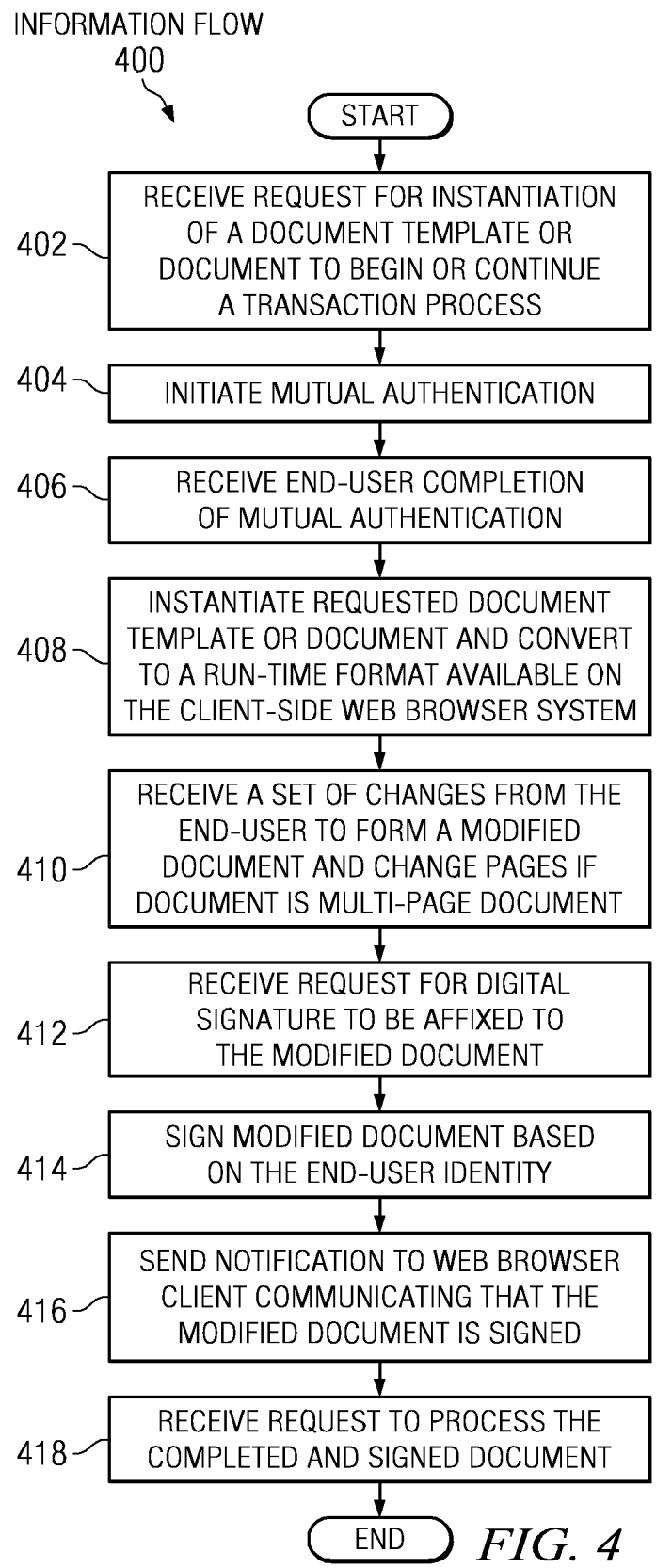
FIG. 4 is a flowchart illustrating a process for creating digital signatures over rich content documents in accordance with the illustrative embodiment.

FIG. 4 is a flowchart illustrating a process for completing a transaction responsive to an end-user request in accordance with the illustrative embodiment. The process in FIG. 4 is implemented by a web application server, such as web application server 302 in FIG. 3.

The process begins by receiving a request for instantiation of a document template or document to begin or continue a transaction process (step 402). Next, the server initiates mutual authentication (step 404) and receives end-user completion of mutual authentication (step 406).

The server then instantiates the requested document template or document and converts the document to a run-time format available on the client-side web browser system (step 408). The server converts the document using a translator, such as document to HTML translator 304 in FIG. 3.

Next, the server receives a set of changes from the end-user to form a modified document and change pages if the document is a multi-page document (step 410). A set of changes is defined herein to include no changes, a single change, and two or more changes. A modified document is defined herein to include a document with no changes, a document with a single change, and a document with two or more changes. The server then receives a request for a digital signature to be generated for the modified document (step 412). The server signs the modified document based on the end-user identity (step 414), which was obtained during the mutual authentication process. The relationship between the digital signature and the document established during signature generation may be according to any of the methods known in the art, including, without limitation, an enveloped signature (wherein the digital signature is affixed to or appears within the document content), an enveloping signature (wherein the document content appears within the signature), or a separated signature (wherein the signature is stored separately and refers to the document using a URI or other external resource pointer). Next, the server sends a notification to the web browser client communicating to the end-user that the modified document is signed (step 416). The server then receives a request to process the completed and signed document (step 418), with the process terminating thereafter.

Figure 5:
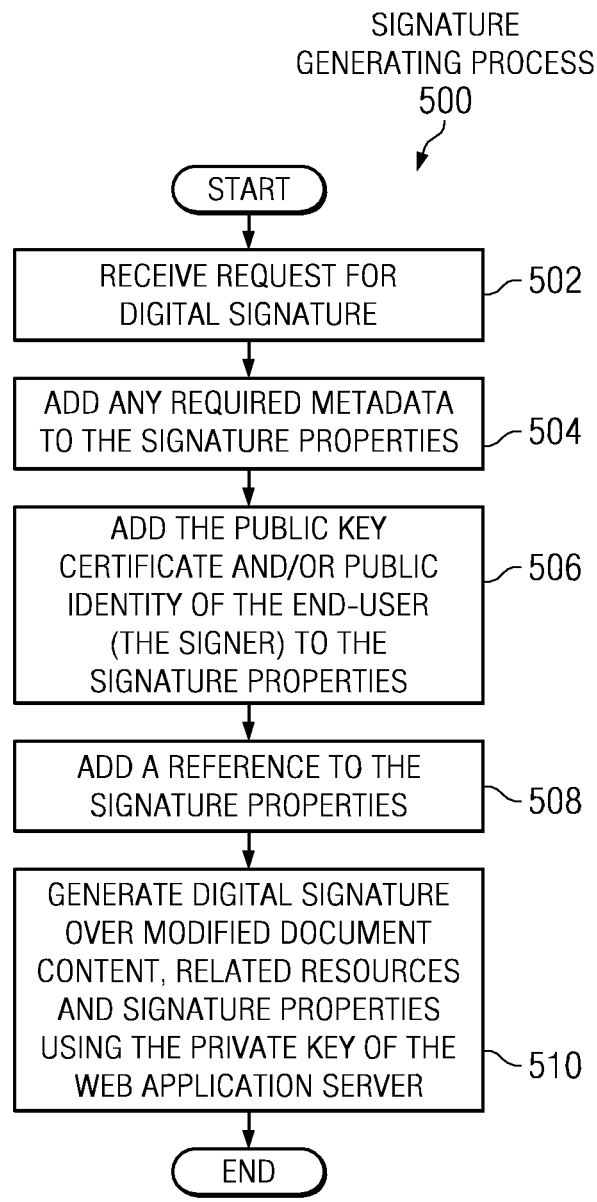
FIG. 5 is a flowchart illustrating a process for generating a digital signature by a web application server in accordance with the illustrative embodiment.

FIG. 5 is a flowchart illustrating a process for generating a signature in accordance with the illustrative embodiment. The process in FIG. 5 is implemented by a web application server, such as web application server 302 in FIG. 3.

The process begins when the server receives a request for a digital signature (step 502). The server adds any required metadata to the signature properties (step 504). For example, metadata could be a timestamp or layout data. The server adds the public key certificate and/or public identity of the end-user (the signer) to the signature properties (step 506). For example, the server might add the public key certificate in an SSL authentication. In other example, the server might add a public identity in a non-public key infrastructure authentication method. Next, the server adds a reference to the signature properties (step 508). A reference indicates the required metadata added to the signature, and is useful for future signature validation purposes. The server generates the digital signature over modified document content, related resources, and signature properties, using the private key of the web application server (step 510) with the process terminating thereafter.

Figure 6:
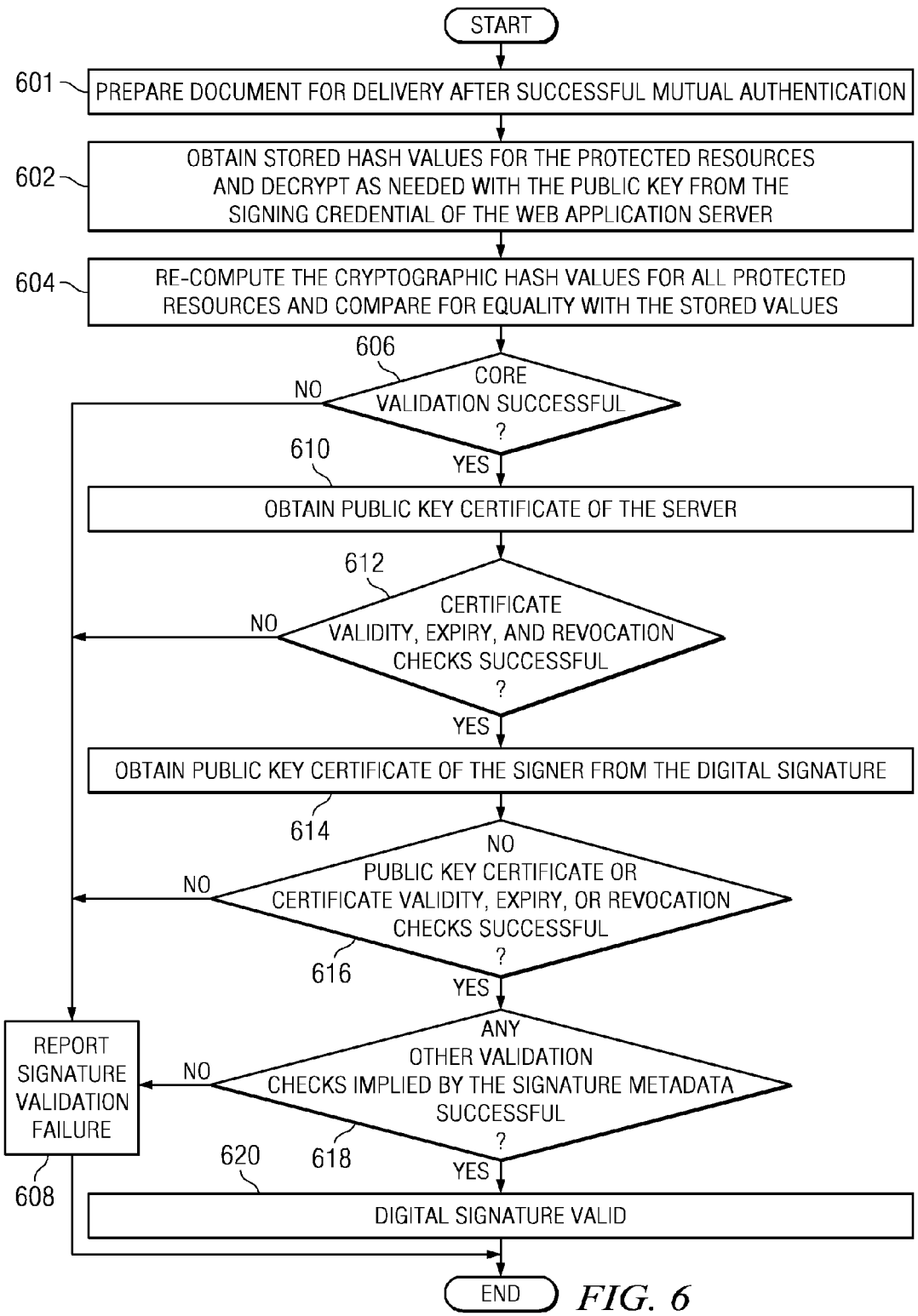
FIG. 6 is a flowchart illustrating a process for validating a digital signature in accordance with the illustrative embodiment.

FIG. 6 is a flowchart illustrating a process for validating a signature in accordance with the illustrative embodiment. The process in FIG. 6 is implemented by a web application server, such as web application server 302 in FIG. 3.

The process begins when the server prepares the document for delivery after a successful mutual authentication (step 601). The server obtains stored hash values for the protected resources and decrypts as needed with the public key from the signing credentials of the web application server (step 602). Next, the server re-computes the cryptographic hash values for all protected resources and compares for equality with the stored values (step 604). Core validation success occurs when the stored hash values and re-computed hash values are equal. If the hash values are not equal, core validation fails.

The server determines whether core validation was successful (step 606) based on successful equality comparisons for all corresponding pairs of hash values. If core validation was not successful, the server reports signature validation failure (step 608). If core validation was successful, the server next obtains the public key certificate of the server (step 610) and runs another validation check to determine if the certificate validity, expiry, and revocation checks were successful (step 612). If the checks were not successful, the server reports signature validation failure (step 608).

If the checks were successful, the server next obtains the public key certificate of the signer from the digital signature (step 614). If the signer's identity was provided with a public key certificate, then the server determines if the certificate validity, expiry, and revocation checks were successful (step 616). If the check was not successful, the server reports signature validation failure (step 608). If the check was successful, the server runs any other validity checks implied by the signature metadata to determine authentication (step 618). If the final check is not successful, the server reports signature validation failure (step 608). If the final check is successful, then the digital signature on the document is valid (step 620) with the process terminating thereafter. Once zero or more digital signatures are validated, the document is translated to a format that can be processed on the client side and then delivered to the client end-user.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different embodiments provide a computer implemented method, apparatus, and computer program product for digitally signing and validating the digital signature of an electronic document, particularly without deploying or installing extra computer code on the client apparatus other than a web browser capable of mutual authentication.

Digital signatures are generated with the private key of the web application server, but signature metadata includes at least a public identifier of the end-user (the signer) obtained during mutual authentication. In one embodiment, the public key certificate of the end-user provides the public identity, as it can only be obtained by the web application server after successful mutual authentication involving the private key of the end-user on the client.

Digital signature validation comprises core validation with the web application server public key certificate as well as validation steps for signature metadata, including at least a validation of the public identity of the signer.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating digital signatures over rich content documents, the computer implemented method comprising:
receiving a request, by a web browser client, for instantiation of an electronic document, wherein the web browser client is a trusted application that has access to private key material of an end-user for authentication;
responsive to successful completion of mutual authentication, wherein a correct private key of the end-user associated with the web browser client is used, between a web application server and the web browser client only for the mutual authentication, providing the electronic document to the client;
receiving an authenticated public identity persisted from the successful completion of mutual authentication for the end-user associated with the web browser client, wherein only a public key or other public identity of the end-user associated with the web browser client is made available to an application context including the web application server;

receiving a set of changes associated with the electronic document to form a modified document;

responsive to receiving, from the web browser client, a request to generate a digital signature for the modified document, generating the digital signature using a private key of the web application server and only the authenticated public identity of the end-user associated with the web browser client, wherein a transmission of a private key of the end-user from the web browser client to the web application server is avoided; and signing the modified document with the digital signature.

2. The computer implemented method of claim 1, wherein the web application server is a zero footprint server.

3. The computer implemented method of claim 1 further comprising:

responsive to receiving the request to generate the digital signature for the modified document, adding metadata and a reference to digital signature properties to form the digital signature, wherein the reference delineates the metadata added to the digital signature properties.

4. The computer implemented method of claim 3, wherein the metadata includes a public key certificate or the authenticated public identity of the end-user associated with the web browser client.

5. The computer implemented method of claim 1, wherein providing the electronic document to the web browser client further comprises:

obtaining stored hash values for a plurality of protected resources;

decrypting, with the public key of the web application server, any stored hash values that were encrypted with the private key of the web application server during digital signature generation;

re-computing cryptographic hash values for the plurality of protected resources; and comparing the cryptographic hash values with the stored hash values.

6. The computer implemented method of claim 5, further comprising:

responsive to a comparison of the cryptographic hash values with the stored hash values resulting in equality between the cryptographic hash values and the stored hash values, indicating a core validation success; and responsive to the comparison of the cryptographic hash values with the stored hash values resulting in inequality between the cryptographic hash values and the stored hash values, indicating a core validation failure.

7. The computer implemented method of claim 6 further comprising:

responsive to the core validation success, checking a public key certificate of the web application server in the digital signature for at least one of invalidity, expiry, and revocation;

responsive to the public key certificate of the web application server being one of invalid, expired, or revoked, indicating a server certificate validation failure; and responsive to a determination that the public key certificate of the web application server is one of valid, unexpired, and un-revoked, indicating a server certificate validation success.

8. The computer implemented method of claim 7, further comprising:

responsive to the server certificate validation success, obtaining a public key certificate of a signer, wherein the signer is the end-user associated with the web browser client;

checking the public key certificate of the signer for at least one of invalidity, expiry and revocation;

responsive to the public key certificate of the signer being one of invalid, expired, or revoked, indicating a signer identity validation failure; and responsive to a determination that the public key certificate of the signer is one of valid, unexpired, and un-revoked indicating a signer identity validation success.

9. The computer implemented method of claim 7, further comprising:

responsive to the server certificate validation success, obtaining the authenticated public identity of a signer, wherein the signer is the end-user associated with the web browser client;

checking the authenticated public identity of the signer for at least one of invalidity, expiry and revocation;

responsive to the authenticated public identity of the signer being one of invalid, expired, or revoked, indicating a signer identity validation failure; and responsive to a determination that the authenticated public identity of the signer is one of valid, unexpired, and un-revoked, indicating a signer identity validation success.

10. The computer implemented method of claim 1, further comprising:

responsive to a signer identity validation success, executing validity checks implied by digital signature metadata;

responsive to failure of at least one of the validity checks implied by the digital signature metadata, indicating a metadata validation failure; and responsive to success of all validity checks implied by the digital signature metadata, indicating a metadata validation success.

11. The computer implemented method of claim 1, further comprising:

responsive to one of core signature validation failure, server certificate validation failure, signer identity validation failure, or metadata validation failure, reporting signature validation failure to the end-user; and responsive to one of core signature validation success, server certificate validation success, signer identity validation success, and metadata validation success, reporting signature validation success to the end-user.

12. A computer program product comprising a non-transitory computer usable storage device having stored there on computer usable program code, the computer usable program code further comprising:

computer usable program code for receiving a request, by a web browser client, for instantiation of an electronic document wherein the web browser client is a trusted application that has access to private key material of an end-user for authentication;

computer usable program code for, responsive to successful completion of mutual authentication, wherein a correct private key of the end-user associated with the web browser client is used, between a web application server and the web browser client only for the mutual authentication, providing the electronic document to the client;

computer usable program code for receiving an authenticated public identity persisted from the successful completion of mutual authentication for the end-user associated with the web browser client, wherein only a public key or other public identity of the end-user associated with the web browser client is made available to an application context including the web application server;

computer usable program code for receiving a set of changes associated with the electronic document to form a modified document;

computer usable program code, responsive to receiving, from the web browser client, a request to generate a digital signature for the modified document, for generating the digital signature using a private key of the web application server and only the authenticated public identity of the end-user associated with the web browser client and wherein a transmission of a private key of the end-user from the web browser client to the web application server is avoided; and computer usable program code for signing the modified document with the digital signature.

13. The computer program product of claim 12, wherein the web application server is a zero footprint server.

14. The computer program product of claim 12 further comprising:

computer usable program code, responsive to receiving the request to generate the digital signature for the modified document, for adding metadata and a reference to digital signature properties to form the digital signature, wherein the reference delineates the metadata added to the digital signature properties.

15. The computer program product of claim 14, wherein the metadata includes a public key certificate or the authenticated public identity of the end-user associated with the web browser client.

16. The computer program product of claim 12, wherein the computer usable program code for providing the electronic document to the web browser client further comprises:

computer usable program code for obtaining stored hash values for a plurality of protected resources;

computer usable program code for decrypting, with the public key of the web application server, any stored hash values that were encrypted with the private key of the web application server during digital signature generation;

computer usable program code for re-computing cryptographic hash values for the plurality of protected resources; and computer usable program code for comparing the cryptographic hash values with the stored hash values.

17. The computer program product of claim 16, further comprising:

computer usable program code, responsive to a comparison of the cryptographic hash values with the stored hash values resulting in equality between the cryptographic hash values and the stored hash values, for indicating a core validation success;

computer usable program code, responsive to the comparison of the cryptographic hash values with the stored hash values resulting in inequality between the cryptographic hash values and the stored hash values, for indicating a core validation failure;

computer usable program code, responsive to the core validation success, for checking the public key certificate of the web application server in the digital signature for at least one of invalidity, expiry, and revocation;

computer usable program code, responsive to the public key certificate of the web application server being at least one of invalid, expired, or revoked, for indicating a server certificate validation failure;

computer usable program code, responsive to a determination that the public key certificate of the web application server is at least one of valid, unexpired, and un-revoked, for indicating a server certificate validation success;

computer usable program code, responsive to the server certificate validation success, for obtaining a public key certificate of a signer, wherein the signer is the end-user associated with the web browser client;

computer usable program code for, checking the public key certificate of the signer for at least one of invalidity, expiry and revocation;

computer usable program code, responsive to the public key certificate of the signer being at least one of invalid, expired, or revoked, for indicating a signer identity validation failure; and computer usable program code, responsive to a determination that the public key certificate of the signer is at least one of valid, unexpired, and un-revoked, for indicating a signer identity validation success.

18. The computer program product of claim 12 further comprising:

computer usable program code, responsive to the signer identity validation success, for executing validity checks implied by the digital signature metadata;

computer usable program code, responsive to failure of at least one of the validity checks implied by the digital signature metadata, for indicating a metadata validation failure; and computer usable program code, responsive to success of all validity checks implied by the digital signature metadata, for indicating a metadata validation success.

19. The computer program product of claim 12, further comprising:

computer usable program code, responsive to at least one of core signature validation failure, server certificate validation failure, signer identity validation failure, or metadata validation failure, for reporting signature validation failure to the end-user; and computer usable program code, responsive to at least one of core signature validation success, server certificate validation success, signer identity validation success, and metadata validation success, for reporting signature validation success to the end-user.

20. A data processing system comprising:

a bus system;

a communications system coupled to the bus system;

a memory connected to the bus system, wherein the memory includes computer usable program code; and a processing unit coupled to the bus system, wherein the processing unit executes the computer usable program code to:

receive a request, by a web browser client, for instantiation of an electronic document, wherein the web browser client is a trusted application that has access to private key material of an end-user for authentication;

provide the electronic document to the client in response to successful completion of mutual authentication, wherein a correct private key of the end-user associated with the web browser client is used, between a web application server and the web browser client only for the mutual authentication;

receive an authenticated public identity persisted from the successful completion of mutual authentication for the end-user associated with the web browser client, wherein only a public key or other public identity of the end-user associated with the web browser client is made available to an application context including the web application server;

receive a set of changes associated with the electronic document to form a modified document;

generate a digital signature using a private key of the web application server and only the authenticated public identity of the end-user associated with the web browser client in response to receiving a request to generate the digital signature for the modified document from the web browser client and wherein a transmission of a private key of the end-user from the web browser client to the web application server is avoided; and sign the modified document with the digital signature.

* * * * *